(12) United States Patent
Park et al.

(10) Patent No.: US 9,713,075 B2
(45) Date of Patent: Jul. 18, 2017

(54) METHOD AND APPARATUS FOR MEASURING CHANNEL FOR SMALL CELL DISCOVERY

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 145 days.

(21) Appl. No.: 14/592,123

(22) Filed: Jan. 8, 2015

(65) Prior Publication Data

US 2015/0223156 A1     Aug. 6, 2015

(30) Foreign Application Priority Data

Jan. 10, 2014  (KR) .......................... 10-2014-0003354
Sep. 1, 2014   (KR) .......................... 10-2014-0115649
Jan. 2, 2015   (KR) .......................... 10-2015-0000030

(51) Int. Cl.
*H04W 48/16*     (2009.01)
*H04W 24/08*     (2009.01)
(Continued)

(52) U.S. Cl.
CPC ......... *H04W 48/16* (2013.01); *H04J 11/0079* (2013.01); *H04L 5/0035* (2013.01);
(Continued)

(58) Field of Classification Search
CPC ... H04L 1/0693; H04L 5/0007; H04L 5/0032; H04L 5/0094; H04L 5/0051;
(Continued)

(56) References Cited

U.S. PATENT DOCUMENTS

2013/0281076 A1  10/2013  Damnjanovic et al.
2014/0029458 A1*  1/2014  Ye .......................... H04W 24/10
                                                      370/252
(Continued)

FOREIGN PATENT DOCUMENTS

KR    10-2013-0014236 A     2/2013

OTHER PUBLICATIONS

Hitachi Ltd., "Further Considerations on Scenario3", R1-113064, 3GPP TSG-RAN WG1 #66b, Zhuhai ,China, Oct. 10-14, 2011.

*Primary Examiner* — Benjamin H Elliott, IV
(74) *Attorney, Agent, or Firm* — IP Legal Services, LLC

(57) ABSTRACT

The present disclosure relates to a method for configuring and measuring a reference signal for small cell discovery. In particular, the present disclosure relates to a method and apparatus for configuring a downlink reference signal used when a UE discovers a small cell base station, and for measuring a reference signal based on the reference signal configuration. According to an embodiment of the present disclosure, a method for a UE to measure a reference signal for small cell discovery may include receiving, from a base station, a higher layer signaling including reference signal configuration information for measuring a channel quality using a reference signal, receiving a reference signal transmitted from a second base station, and determining the reference signal based on the reference signal configuration information.

14 Claims, 13 Drawing Sheets

(51) Int. Cl.
*H04J 11/00* (2006.01)
*H04L 5/00* (2006.01)

(52) U.S. Cl.
CPC .......... *H04L 5/0051* (2013.01); *H04L 5/0073* (2013.01); *H04L 5/0094* (2013.01); *H04W 24/08* (2013.01)

(58) Field of Classification Search
CPC .... H04L 5/0073; H04L 5/0035; H04W 48/16; H04W 24/08; H04W 92/24; H04J 11/0079
See application file for complete search history.

(56) References Cited

U.S. PATENT DOCUMENTS

| | | | |
|---|---|---|---|
| 2014/0185573 A1 | 7/2014 | Yoon et al. | |
| 2014/0241323 A1* | 8/2014 | Park | H04L 5/0035 370/332 |
| 2014/0247749 A1* | 9/2014 | Kim | H04B 7/024 370/252 |
| 2015/0092582 A1* | 4/2015 | Liao | H04J 11/005 370/252 |
| 2015/0146542 A1* | 5/2015 | Xia | H04L 5/0032 370/241.1 |
| 2015/0163690 A1* | 6/2015 | Pani | H04W 24/10 370/252 |
| 2015/0163719 A1* | 6/2015 | Lim | H04W 36/38 455/438 |
| 2015/0173064 A1* | 6/2015 | Kim | H04B 7/26 370/252 |
| 2015/0189574 A1* | 7/2015 | Ng | H04W 24/08 370/252 |
| 2015/0223156 A1* | 8/2015 | Park | H04W 48/16 370/252 |
| 2015/0289079 A1* | 10/2015 | Webb | H04J 11/0069 370/328 |
| 2016/0157194 A1* | 6/2016 | Svedman | H04W 56/001 370/350 |
| 2016/0242083 A1* | 8/2016 | Guan | H04W 24/08 |

* cited by examiner

— BACKHAUL LINK WITHIN CLUSTER
---·--- BACKHAUL LINK BETWEEN SMALL CELLS AND MACRO CELL

——— BACKHAUL LINK WITHIN CLUSTER
—·—·— BACKHAUL LINK BETWEEN SMALL CELLS AND MACRO CELL

— BACKHAUL LINK WITHIN CLUSTER
-·-·-·- BACKHAUL LINK BETWEEN SMALL CELLS AND MACRO CELL

FIG.9

MeasObjectEUTRA information element

```
-- ASN1START

MeasObjectEUTRA ::=              SEQUENCE {
    carrierFreq                      ARFCN-ValueEUTRA,
    allowedMeasBandwidth             AllowedMeasBandwidth,
    presenceAntennaPort1             PresenceAntennaPort1,
    neighCellConfig                  NeighCellConfig,
    offsetFreq                       Q-OffsetRange                         DEFAULT dB0,
    -- Cell list
    cellsToRemoveList                CellIndexList                                           OPTIONAL,      -- Need ON
    cellsToAddModList                CellsToAddModList                                       OPTIONAL,      -- Need ON
    -- Black list
    blackCellsToRemoveList           CellIndexList                                           OPTIONAL,      -- Need ON
    blackCellsToAddModList           BlackCellsToAddModList                                  OPTIONAL,      -- Need ON
    cellForWhichToReportCGI          PhysCellId                                              OPTIONAL,      -- Need ON
    ...,
    [[ measCycleSCell-r10            MeasCycleSCell-r10                                      OPTIONAL,      -- Need ON
       measSubframePatternConfigNeigh-r10  MeasSubframePatternConfigNeigh-r10   OPTIONAL      -- Need ON
    ]],
    [[ widebandRSRQ-Meas-r11         BOOLEAN       OPTIONAL                                                 -- Cond WB-RSRQ
    ]]
}

MeasObjectEUTRA-v9e0 ::=         SEQUENCE {
    carrierFreq-v9e0                 ARFCN-ValueEUTRA-v9e0
}

CellsToAddModList ::=            SEQUENCE (SIZE (1..maxCellMeas)) OF CellsToAddMod CellsToAddMod ::=                SEQUENCE {
    cellIndex                        INTEGER (1..maxCellMeas),
    physCellId                       PhysCellId,
    cellIndividualOffset             Q-OffsetRange
}

BlackCellsToAddModList ::=       SEQUENCE (SIZE (1..maxCellMeas)) OF BlackCellsToAddMod BlackCellsToAddMod ::=           SEQUENCE {
    cellIndex                        INTEGER (1..maxCellMeas),
    physCellIdRange                  PhysCellIdRange
}

MeasCycleSCell-r10 ::=           ENUMERATED (sf160, sf256, sf320, sf512,
                                             sf640, sf1024, sf1280, spare1}

MeasSubframePatternConfigNeigh-r10 ::=  CHOICE {
    release                              NULL,
    setup                                SEQUENCE {
        measSubframePatternNeigh-r10         MeasSubframePattern-r10,
        measSubframeCellList-r10             MeasSubframeCellList-r10        OPTIONAL    -- Cond measSubframe
    }
}

MeasSubframeCellList-r10 ::=     SEQUENCE (SIZE (1..maxCellMeas)) OF PhysCellIdRange

-- ASN1STOP
```

FIG.10

RRCConnectionReconfiguration message for SCell addition/release

```
SCellToAddModList-r10 ::=       SEQUENCE (SIZE (1..maxSCell-r10)) OF SCellToAddMod-r10

SCellToAddMod-r10 ::=    SEQUENCE {
    sCellIndex-r10              SCellIndex-r10,
    cellIdentification-r10      SEQUENCE {
        physCellId-r10              PhysCellId,
        dl-CarrierFreq-r10          ARFCN-ValueEUTRA
    }                                                           OPTIONAL,  -- Cond SCellAdd
    radioResourceConfigCommonSCell-r10      RadioResourceConfigCommonSCell-r10   OPTIONAL,
    -- Cond SCellAdd
    radioResourceConfigDedicatedSCell-r10   RadioResourceConfigDedicatedSCell-r10  OPTIONAL
    -- Cond SCellAdd2
    ...,
    [[ dl-CarrierFreq-v1090         ARFCN-ValueEUTRA-v9e0   OPTIONAL    -- Cond
    EARFCN-max
    ]]
}

SCellToReleaseList-r10 ::=      SEQUENCE (SIZE (1..maxSCell-r10)) OF SCellIndex-r10
```

METHOD AND APPARATUS FOR MEASURING CHANNEL FOR SMALL CELL DISCOVERY

CROSS-REFERENCE TO RELATED APPLICATION

This application claims priority under 35 U.S.C. §119(a) to Korean Application Serial Nos. 10-2014-0003354, 10-2014-0115649 & 10-2015-0000030, which were filed in the Korean Intellectual Property Office on Jan. 10, 2014, Sep. 1, 2014 & Jan. 2, 2015 the entire content of which is hereby incorporated by reference.

BACKGROUND OF THE INVENTION

1. Field of the Invention

The present disclosure relates to a method of configuring and measuring a reference signal for small cell discovery. In particular, the present disclosure relates to a method and apparatus for configuring a downlink reference signal used when a User Equipment (UE) detects a small cell base station and for measuring a reference signal based on the reference signal configuration.

2. Description of the Prior Art

Due to advances in communication systems, various types of wireless UEs have been introduced to consumers, such as companies and individuals. A current mobile communication system is affiliated with 3GPP, for example, Long Term Evolution (LTE), LTE-Advanced (LTE-A), and the like. Such a mobile communication system may be a high capacity communication system capable of transmitting and receiving various types of data, such as image data, wireless data, and the like, beyond providing a voice-based service. Accordingly, it has been required to develop for technology for transmitting a large amount of data, similar to data transmission in a wired communication network. Due to the introduction of various deployment scenarios of a plurality of cells (e.g., small cells), it is required to develop new technology or method for applying carrier aggregation to such various deployment scenarios.

Due to abrupt increment in the demand for wireless UEs and an amount of transmission/reception data thereof, a communication system needs to process a large amount of data. Therefore, various types of base stations for data processing have been developed. Such increment in base stations and/or data transmission/reception points may cause increase in a power consumption amount of the entire communication system. For example, in order to process a large amount of data, a plurality of base stations is densely installed in a service area. In this case, an amount of wireless signals transmitted or received by each base station increases and signal interference increases in such a service area. Thus, such problems may cause deteriorate a data processing rate.

SUMMARY OF THE INVENTION

Embodiments of the present disclosure, invented in response to the above described demand, are to provide a method for enabling a UE to receive a reference signal of a small cell base station capable of performing an ON/OFF switching operation in a small cell deployment environment including a macro cell and small cells overlapping the macro cell.

In addition, the present disclosure is to provide a method for receiving, by a UE, reference signal configuration information in order for identifying a reference signal transmitted from a base station.

In addition, the present disclosure is to provide a method and apparatus for a UE to measure the channel quality of a base station using a reference signal for small cell discovery to minimize signal interference.

In accordance with an aspect of the present disclosure, there is provided a method for measuring, by a UE, a reference signal for small cell discovery. The method includes receiving, from a first base station, a higher layer signaling including reference signal configuration information for measuring a channel quality using the reference signal, receiving the reference signal transmitted from a second base station, and identifying the reference signal, based on the reference signal configuration information.

In accordance with an aspect of the present disclosure, there is provided a method for transmitting, by a first base station, reference signal configuration information for small cell discovery. The method includes generating reference signal configuration information associated with a reference signal transmitted from a second base station, and transmitting, to a UE, the reference signal configuration information through higher layer signaling.

In accordance with an aspect of the present disclosure, there is provided a UE for measuring a reference signal for small cell discovery. The UE includes a receiving unit and a controller. The receiving unit is configured to receive, from a first base station, a higher layer signaling including reference signal configuration information for measuring a channel quality using the reference signal. The receiving unit is also configured to receive the reference signal transmitted from a second base station. The controller is configured to identify the reference signal, based on the reference signal configuration information.

In accordance with an aspect of the present disclosure, there is provided a first base station for transmitting reference signal configuration information for small cell discovery. The first base station includes a controller and a transmitting unit. The controller is configured to generate reference signal configuration information associated with a reference signal transmitted from a second base station. The transmitting unit is configured to transmit the reference signal configuration information to a UE through higher layer signaling.

The present disclosure provides a procedure for enabling a UE to receive a reference signal of a small cell base station that performs an ON/OFF switching operation in a small cell deployment environment including a macro cell and small cells overlapping the macro cell.

In addition, the present invention provides a method for enabling a UE to receive reference signal configuration information for identifying a reference signal transmitted from a base station.

In addition, the present disclosure provides a method and apparatus for enabling a UE to measure the channel quality of a base station using a reference signal for small cell discovery to minimize signal interference.

BRIEF DESCRIPTION OF THE DRAWINGS

The above and other objects, features and advantages of the present invention will be more apparent from the following detailed description taken in conjunction with the accompanying drawings, in which:

FIG. 9 is a flowchart illustrating an example of an information element of measurement configuration information;

FIG. 10 is a diagram illustrating an example of an information element of an RRC configuration reconfiguration (RRCConnectionReconfiguration) message as higher layer signaling of the present disclosure;

DETAILED DESCRIPTION OF THE EXEMPLARY EMBODIMENTS

Figure 1:
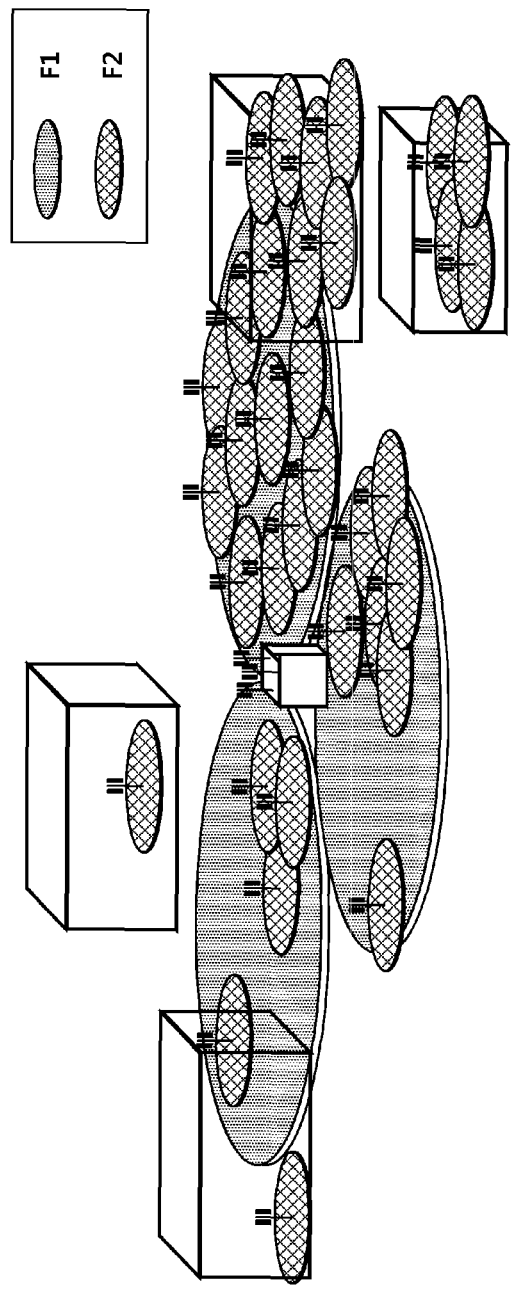
FIG. 1 is a diagram illustrating a small cell deployment according to an embodiment.

Hereinafter, embodiments of the present disclosure will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The wireless communication system may be widely installed so as to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a User Equipment (UE) in wideband code division multiple access (WCDMA), long term evolution (LTE), high speed packet access (HSPA), and the like, and an Mobile station (MS), a User Terminal (UT), an Subscriber Station (SS), a wireless device, and the like in global systems for mobile communication (GSM).

The base station or a cell may generally refer to a station where communication with the user equipment is performed, and may also be referred to as a Node-B, an evolved Node-B (eNB), a Sector, a Site, a Base Transceiver System (BTS), an Access Point, a Relay Node, an remote radio head (RRH), and the like.

That is, the base station or the cell may be construed as an inclusive concept indicating a portion of an area covered by a Base Station Controller (BSC) in code division multiple access (CDMA), a NodeB in wideband CDMA (WCDMA), an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) The base station may be a device itself that provides a mega cell, a macro cell, a micro cell, a pico cell, a femto cell, and a small cell in association with a wireless area, or ii) the base station may indicate a wireless area itself. In i), the base station may denote devices providing a predetermined wireless service area and controlled by the same entity or devices cooperatively establishing a wireless service area through interaction with other devices. Based on a configuration type of a wireless service area, the base station may include an eNB, an RRH, an antenna, an RU, a Low Power Node (LPN), a point, a transmission/reception point, a transmission point, a reception point, and the like. In ii), the base station may denote a wireless service area itself where a UE receives a signal from or transmits a signal to other UE or a neighboring base station.

Therefore, the base station may include a mega cell, a macro cell, a micro cell, a pico cell, a femto cell, a small cell, an RRH, an antenna, an RU, an LPN, a point, an eNB, a transmission/reception point, a transmission point, and a reception point.

In the specifications, the user equipment and the base station are used as two inclusive subjects for transmitting and receiving signals to realize technology and technical concepts described in the specifications, and the user equipment and the base station may not be limited to a predetermined term or word. The user equipment and the base station are used as two inclusive transmitting/receiving subjects (Uplink and Downlink) to realize technology and technical concepts described in the specifications, and the user equipment and the base station may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. Embodiments of the present disclosure may be applicable to resource allocation in an asynchronous wireless communication scheme that is advanced through GSM, WCDMA, and HSPA, to LTE and LTE-advanced, and may be applicable to resource allocation in a synchronous wireless communication scheme that is advanced through CDMA and CDMA-2000, to UMB. Embodiments of the present disclosure may not be limited to a specific wireless communication field and may include all technical fields to which the technical idea of the embodiments of the present disclosure is applicable.

Uplink transmission and downlink transmission may be performed based on a Time Division Duplex (TDD) scheme that performs transmission based on different times, or based on a Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), Physical Control Format Indicator Channel (PCFICH), Physical Hybrid ARQ Indicator Channel (PHICH), Physical Uplink Control Channel (PUCCH), and the like, and may be configured as a data channel, such as a Physical Downlink Shared Channel (PDSCH), a Physical Uplink Shared Channel (PDSCH), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a UE, and an uplink refers to communication or a communication path from a UE to a multi-transmission/reception point. In a downlink, a transmitter may be a part of a multiple transmission/reception point and a receiver may be a part of a UE. In an uplink, a transmitter may be a part of a UE and a receiver may be a part of a multiple transmission/reception point.

Hereinafter, an event of transmitting and receiving a signal through a PUCCH, a PUSCH, a PDCCH, an EPDSCH, a PDSCH, and the like may be described as "a PUCCH, a PUSCH, a PDCCH, an EPDCCH, or a PDSCH is transmitted or received".

In addition, hereinafter, description of "a PDCCH is transmitted or received, or a signal is transmitted or received through a PDCCH" includes meaning of "an EPDCCH is transmitted or received, or a signal is transmitted or received through an EPDCCH".

That is, a physical downlink control channel used herein may indicate one of a PDCCH and an EPDCCH and may indicate a meaning including both a PDCCH and an EPDCCH.

In addition, for convenience and ease of understanding, embodiments are described based on one of an EPDCCH and a PDCCH, but the embodiments are not limited thereto. For example, the PDCCH can be applied to the embodiment described with the EPDCCH, and the EPDCCH can be applied to the embodiment described with the PDCCH.

Hereinafter, higher layer signaling includes RRC signaling that transmits RRC information including an RRC parameter.

An eNB executes downlink transmission to UEs. The eNB may transmit a Physical Downlink Shared Channel (PDSCH) which is a primary physical channel for unicast transmission. The eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

In the present specification, a macro cell and a small cell are distinguished based on a relative coverage size of a communication-enabled cell, and the macro cell has a relatively larger coverage size than the small cell. In addition, the macro cell and the small cell may be formed by a corresponding base station or a transmission/reception point. In the present specification, a base station that provides a macro cell is referred to as a macro cell base station, a master base station (MeNB), or a first base station, and a base station that provides a small cell is referred to as a small cell base station, a secondary base station (SeNB), or a second base station. In addition, embodiments of the present disclosure will be described with assumption that a base station capable of changing an operation state between an active (ON) state and a dormant (OFF) stat is a small cell. However, the embodiments of the present disclosure are not limited thereto.

Embodiments of the present disclosure provide a downlink reference signal configuration method for enabling a UE to detect a cell formed by a base station (e.g., eNB, RRH, or RU) in a 3GPP LTE or LTE-Advanced wireless mobile communication system. In particular, as a method of reducing an amount of power consumed by a base station (e.g., eNB, RRH, or RU), and as a method of reducing interference to a neighboring cell, embodiments of the present invention will be described with assumption that the embodiments support a semi-static or dynamic cell on/off mechanism that activates (turning ON) or deactivates (turning OFF) a corresponding cell based on the number of UEs included in the corresponding cell or an amount of data traffic. In this instance, embodiments of the present disclosure provide a downlink reference signal configuration method for cell detection or cell discovery of a UE.

In connection with the above, a method for configuring a small cell detection/discovery reference signal according to semi-static or dynamic small cell on/off mechanism in various types of small cell base stations where a macro cell overlapping with small cells will be described. However, the embodiments of the present disclosure are not limited thereto. That is, the embodiments of the present disclosure may be applied to a reference signal transmitted by a base station performing an ON/OFF switching operation in various ways.

Various schemes may be defined for applying coordinated MultiPoint (CoMP) technologies for controlling a macro cell formed by a high powered base station (e.g., eNB) and a plurality of small cells each formed by a low powered Remote Radio Head (RRH) connected with the high powered base station through an optical cable in a 3GPP LTE system or a LTE-Advanced system. In addition, various technologies may be introduced for controlling interference in a heterogeneous network where a macro cell overlaps a micro cell or a pico cell for supporting a hot spot or a coverage hole. In addition, there are many researches in progress for developing various communication methods using the above described small cell.

Hereinafter, a small cell deployment scenario according to embodiments of the present disclosure will be described.

FIG. 1 is a diagram illustrating a small cell deployment according to an embodiment.

Figure 2:
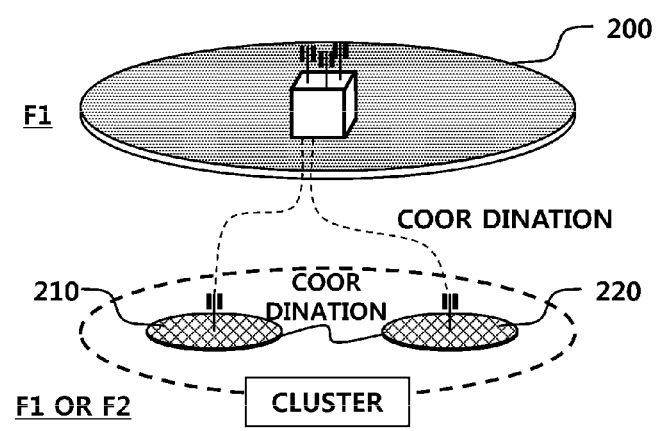
FIG. 2 is a diagram illustrating a small cell deployment scenario.
Figure 3:
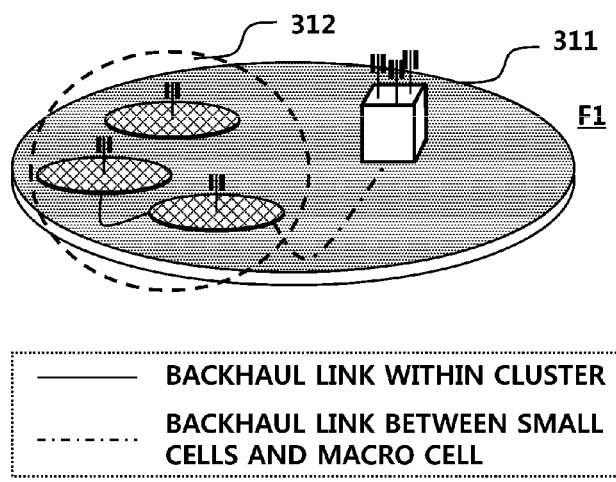
FIG. 3 through FIG. 6 are diagrams illustrating scenarios of a small cell deployment.

In FIG. 1, a macro cell coexists with plurality of small cells in a communication environment. In FIG. 2 and FIG. 3, communication environments are distinguished according to whether a macro coverage is present, whether a corresponding small cell is an outdoor cell or an indoor cell, whether the deployment of a corresponding small cell is sparse or dense, and whether a corresponding small cell uses a frequency spectrum identical to a macro cell from the perspective of spectrum.

FIG. 2 illustrates a small cell deployment scenario. FIG. 2 illustrates a representative configuration of a scenario of FIG. 3. FIG. 2 illustrates a small cell deployment scenario and includes scenarios #1, #2a, #2b, and #3. A reference numeral 200 indicates a macro cell. Reference numerals 210 and 220 indicate small cells. In FIG. 2, an overlapped macro cell may be or may be not present. Coordination may be performed between the macro cell 200 and the small cells 210 and 220 or between the small cells 210 and 220. An overlap area among the macro cell 200, the small cell 210, and the small cell 220 may be bound as a cluster.

FIG. 3 to FIG. 6 are diagrams for describing detailed scenarios of a small cell deployment.

FIG. 3 illustrates a small cell deployment scenario #1. The scenario #1 may be a co-channel deployment scenario of a small cell and a macro cell. In the scenario #1, a communication environment may include an overhead macro. The scenario #1 may be an outdoor small cell scenario. FIG. 3 indicates a case in which all of a macro cell 311 and small cells are outdoor cells. A numeral reference 312 indicates a small cell cluster. Users are distributed in both the indoor and outdoor cells.

A solid line connecting small cells in the small cell cluster 312 indicates a backhaul link within a cluster. A broken line connecting a base station of the macro cell and the small cells in the cluster indicates a backhaul link between small cells and a macro cell.

Figure 4:
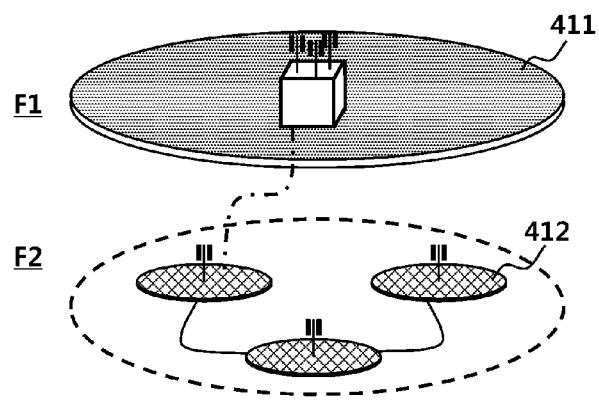

FIG. 4 illustrates a small cell deployment scenario #2a. In the scenario #2a, a communication environment may include an overlaid macro cell, and a small cell and a macro cell use different frequency spectrums. The scenario #2a may be an outdoor small cell scenario. A macro cell 411 and small cells are outdoor cells, and a reference numeral 412 indicates a small cell cluster. Users are distributed in both the indoor and outdoor cells.

Solid lines connecting small cells in the small cell cluster 412 indicate a backhaul link within a cluster. A broken line connecting a base station of the macro cell and the small cells in the cluster indicates a backhaul link between small cells and a macro cell.

Figure 5:
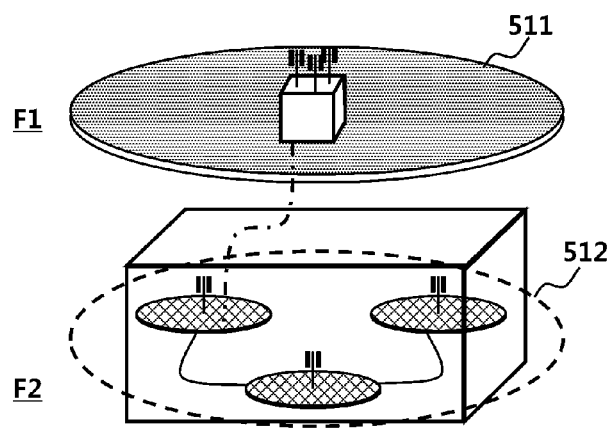

FIG. 5 illustrates a small cell deployment scenario #2b. In the scenario #2b, a communication environment includes an overlaid macro cell, and a small cell and a macro cell use different frequency spectrums. The scenario #2b may be an indoor small cell scenario. A macro cell 511 is an indoor cell, and all small cells are indoor cells. A reference numeral 512 indicates a small cell cluster. Users are distributed in both the indoor and outdoor cells.

Solid lines connecting small cells in the small cell cluster 512 indicate a backhaul link within a cluster. A broken line connecting a base station of the macro cell and the small cells in the cluster indicates a backhaul link between small cells and a macro cell.

Figure 6:
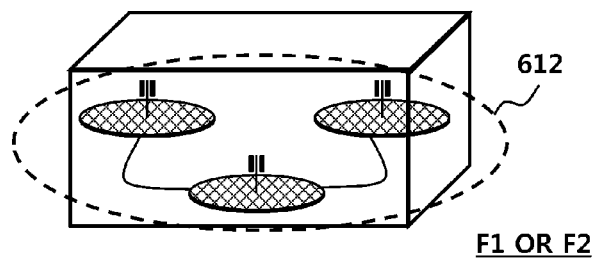

FIG. 6 illustrates a small cell deployment scenario #3. The scenario #3 may be an indoor small cell scenario when a macro coverage is not present. A reference numeral 612 indicates a small cell cluster. In addition, all small cells are indoor cells, and users are distributed in both the indoor and outdoor cells.

Solid lines connecting small cells in the small cell cluster 612 indicate a backhaul link within a cluster. A broken line connecting a base station of the macro cell and the small cells in the cluster indicates a backhaul link between small cells and a macro cell.

Frequencies F1 and F2, used in FIG. 1 and used in the above described various small cell scenarios of FIG. 2 to FIG. 6, may be frequencies that support an identical duplex mode. Alternatively, the frequencies F1 and F2 may have different duplex modes. For example, the frequency F1 supports an FDD mode, and the frequency F2 supports a TDD mode. Alternatively, the frequency F1 supports a TDD mode, and the frequency F2 supports a FDD mode.

<Small Cell Discovery>

In a typical 3GPP LTE system or a typical LTE-Advanced system, a Primary Synchronization Signal (PSS), a Secondary Synchronization Signal (SSS), and a cell specific reference signal (CRS) are used as a downlink synchronization and reference signal in order to enable a UE to detect a cell formed by a base station/eNB/RU/RRH. Accordingly, the base station/eNB/RU/RRH transmits a PSS/SSS at an interval of about 10 ms radio frame based on a frame structure type (e.g., Time Division Duple (TDD) and Frequency Division Duplex (FDD)). In the case of the FDD, the base station/eNB/RU/RRH transmits a PSS/SSS through zero$^{th}$ and fifth downlink subframes. In the case of the TDD, the base station/eNB/RU/RRH transmits a PSS/SSS through first and sixth downlink subframes. Also, the base station transmits a CRS through all downlink subframes.

However, since the small cell deployment scenario requires a small cell ON/OFF switching operation and the like, a discovery procedure associated with the small cell ON/OFF switching operation is required. Therefore, there is a desire for defining a new small cell discovery procedure based on a new reference signal in addition to the PSS/SSS and CRS-based small cell discovery method.

When a plurality of small cells overlaps a macro cell coverage, a total system throughput increases through a cell splitting gain. However, there are drawbacks, such as, interference generated between a small cell and a macro cell which decreases the cell splitting gain, increase in system power consumption due to the plurality of base stations, increase in maintenance costs, and the like. Particularly, although no UE is located in a small cell coverage, a corresponding small cell base station/eNB/RU/RRH constantly transmits a downlink signal including a PSS/SSS and a PBC or a CRS. Such transmission of the downlink signal is unnecessary. In particular, the corresponding small cell base station/eNB/RU/RRH consumes power for the transmission and causes interference in a neighboring cell due to the unnecessary transmission of the downlink signal.

In order to overcome such problem, there is a demand for a small cell ON/OFF switching operation that switches an operation state of a corresponding small cell base station/eNB/RU/RRH from an active (ON) mode/state to a dormant (OFF) mode/state based on the number of UEs connected to a small cell base station or based on whether a UE connected to a small cell base station is present in a corresponding small cell. In order to support a dynamic or semi-static small cell ON/OFF switching operation, it is required to define a cell measurement/discovery procedure of a UE for a small cell in a dormant (OFF) state. In addition to a typical PSS/SSS and CRS-based cell measurement/discovery procedure, it is also required to define a CSI-RS-based cell measurement/discovery method or a PRS-based cell measurement/discovery method. Furthermore, it is required to define a new discovery reference signal (RS)-based cell measurement/discovery procedure.

Embodiments of the present disclosure relate to a method for enabling a user equipment to identify a reference signal transmitted from a base station when a state of a base station is changed based on the number of UEs, data traffic, or the like, in various types of small cell deployment scenarios. In addition, embodiments of the present disclosure relate to a method and apparatus for enabling a UE to distinguish and identify a reference signal transmitted from a base station, a state of a base station, and a signal type of a reference signal.

Figure 7:
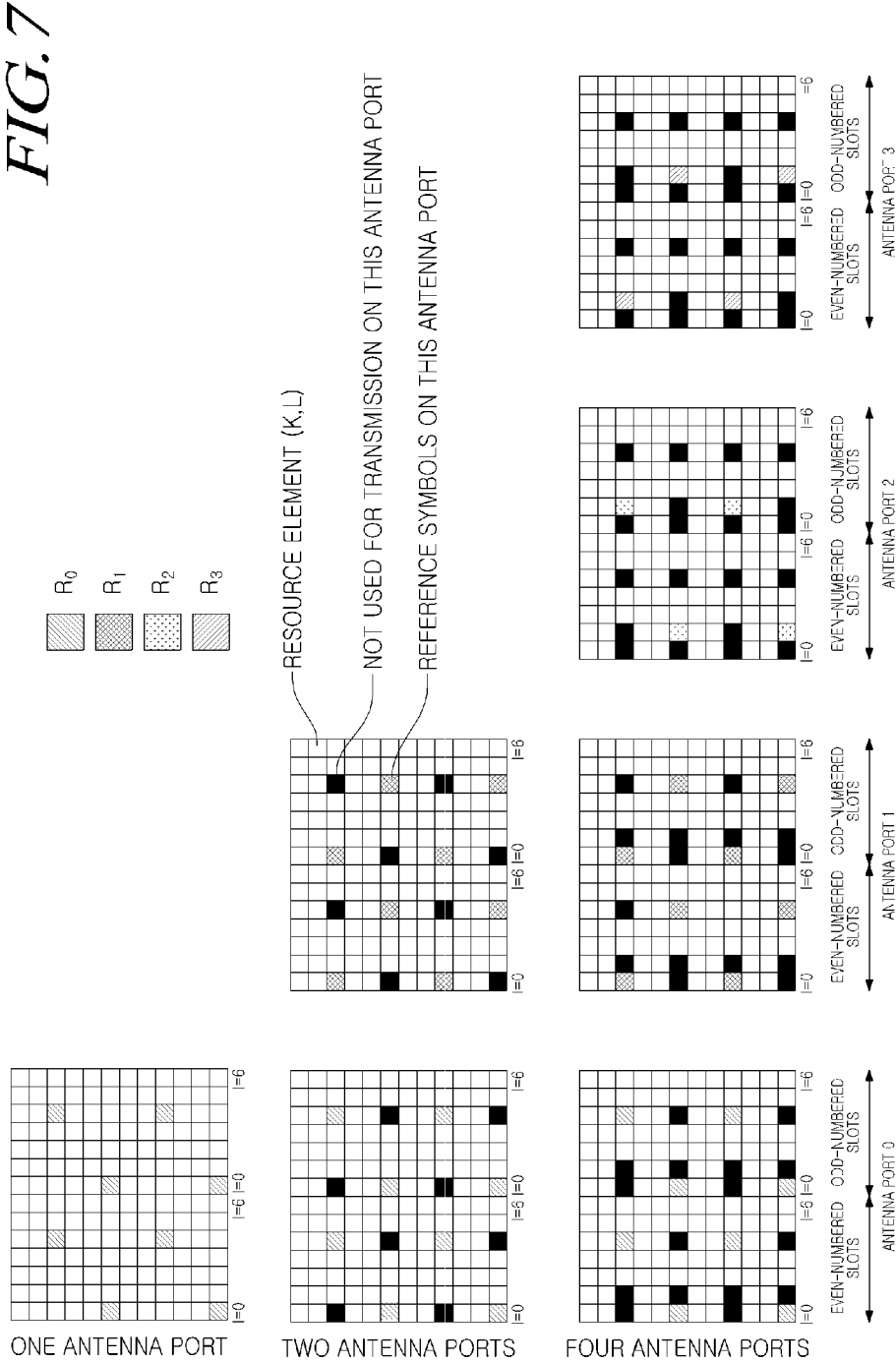
FIG. 7 is a diagram illustrating an example of allocation of a radio resource of a downlink reference signal.

FIG. 7 is a diagram illustrating allocation of a radio resource of a downlink reference signal.

In a typical system, such as a 3GPP LTE/LTE-Advanced system, a base station/eNB/RU/RRH was required to transmit a Cell-specific Reference Signal (CRS) in all downlink subframes based on the number of antenna ports installed in the corresponding base station for enabling a UE to perform downlink channel measurement for mobility management (e.g., handover of a UE or cell selection/reselection) and secondary serving cell measurement for carrier aggregation as shown in FIG. 7. However, the base station/eNB/RU/RRH transmits a CRS only at one of the first and second OFDM symbols of a first slot in a downlink subframe set as an MBSFN subframe.

Referring to FIG. 7, a base station performs CRS mapping using different resource elements according to the number of antenna ports.

Accordingly, when a UE connects to a base station, the UE receives a CRS transmitted from the base station through downlink subframes during a predetermined time period and measures a RSRP/RSRQ. The UE reports the measured RSRP/RSRQ result to the base station. Based on the measured RSRP/RSPQ, an associated network entity determines whether to perform a mobility management procedure (e.g., handover) and whether to activate/deactivate a secondary serving cell for carrier aggregation. In addition, the CRS may be used for channel measurement for determining a target base station of handover in association with the movement of a UE that connects to a neighboring base station. The CRS may be also used for channel measurement for cell selection/reselection of idle state UEs. Therefore, although no UE is connected to a base station, the base station constantly transmits the CRS through all downlink subframes.

In a communication environment including a plurality of small cells overlapping a macro cell, such small cells are often connected to no UE. When a small cell is connected to no UE, it is unnecessary to transmit a downlink signal, such as a CRS and PSS/SSS or a PBCH. Such unnecessary CRS transmission may cause interference generated in a macro cell or in a neighboring small cell. In addition, the small cell base station/eNB/RU/RRH may consume unnecessary power for transmitting the CRS through each downlink subframe.

To overcome the above problems, a semi-static small cell ON/OFF switching operation method or a dynamic small cell ON/OFF switching operation method may be used to change an operation state of a small cell from an active state into a dormant state when the small cell does not have a connected UE or data traffic. That is, a small cell may be dynamically controlled to change an ON/OFF mode thereof at a subframe level or 10 ms radio frame level. Alternatively, a small cell may be semi-statically controlled to change an ON/OFF mode thereof to support an inactive mode operation that does not perform transmission of a downlink signal and a downlink channel (e.g., a PSS/SSS, a CRS).

When the semi-static or dynamic small cell ON/OFF switching operation is applied to a small cell base station, the small cell base station does not transmit a CRS for downlink channel measurement at all downlink subframes if the small cell is in a dormant state (e.g., Off state). Thus, it is required to define an operation for enabling a UE to perform a small cell discovery procedure. That is, since the small cell base station does not transmit a downlink signal when the small cell base station is in a dormant state, the UE is unable to determine whether the UE is located in a service coverage area of a small cell base station in the dormant state (e.g., OFF state) or unable to obtain information associated with a channel state of the corresponding small cell in the dormant state. Therefore, the small cell base station needs to transmit a downlink reference signal for small cell discovery although the small cell base station is in the dormant state. Based on such a downlink reference signal, the UE may be able to measure the channel state of the small cell and to determine whether the UE is located in the corresponding service coverage area of the small cell base station.

Embodiments of the present disclosure introduce a plurality of cell discovery procedures including a CSI-RS-based cell discovery procedure, a Positioning Reference Signal (PRS)-based cell discovery procedure, and a PSS, SSS, and CRS-based cell (channel) measurement reference signal. In accordance with at least one embodiment, a small cell base station transmits information on a cell measurement/discovery type or a cell discovery procedure identification (ID) to a UE, and the UE may perform a cell discovery procedure based on the transmitted information.

Figure 8:
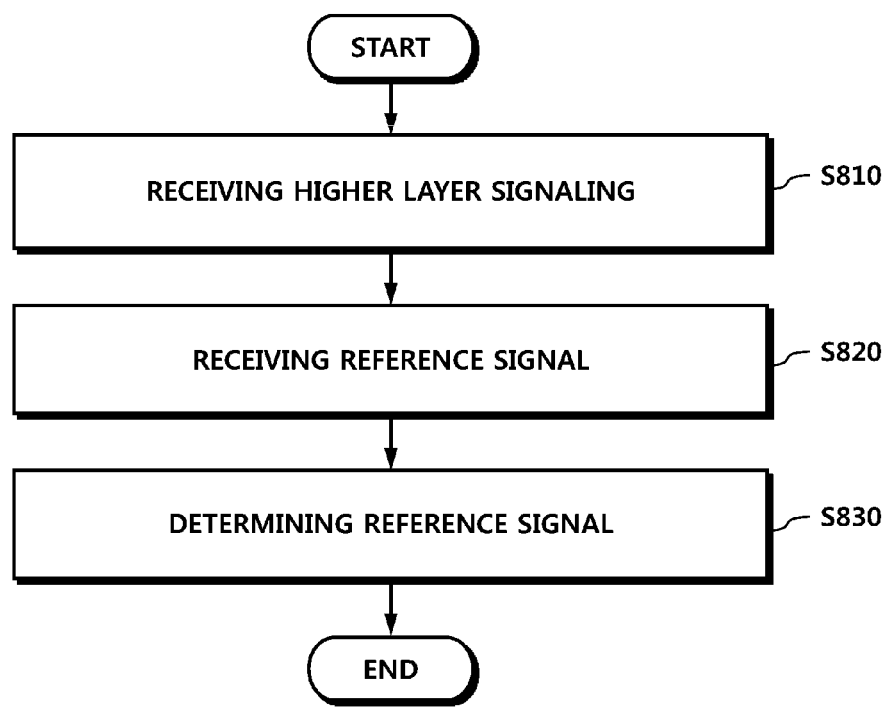
FIG. 8 is a flowchart illustrating operations of a UE according to an embodiment of the present disclosure.

FIG. 8 is a flowchart illustrating operations of a UE according to an embodiment.

According to an embodiment, a method may be provided for enabling a UE to measure a reference signal for small cell discovery. The method may include receiving, from a first base station, higher layer signaling including reference signal configuration information for measuring a channel quality using a reference signal, receiving a reference signal transmitted from a second base station, and identifying the reference signal based on the reference signal configuration information.

Referring to FIG. 8, a UE is enabled to measure a reference signal for small cell discovery according to embodiments. Such a UE may receive higher layer signaling from a first base station in operation S810. The higher layer signal may include reference signal configuration information for measuring a channel quality using a reference signal. For example, the UE may receive reference signal configuration information from a base station coupled with the UE through a radio link. The reference signal configuration information includes configuration information in association with channel quality measurement or cell discovery to be performed using the reference signal that the UE receives. For example, the reference signal configuration information may include information indicating various combinations of signals forming a reference signal, or may include base station state information such as a dormant state, an active state, or the like. As described above, the reference signal configuration information may include information indicating a discovery procedure to use and/or a reference signal to identify. The higher layer signaling may include an RRC connection reconfiguration message. The configuration information associated with a reference signal is included in the RRC connection reconfiguration message as one information element.

The UE may receive a reference signal transmitted from a second base station in operation S820. For example, the UE may receive the reference signal transmitted by the second base station in a dormant state. The reference signal may include a PSS, an SSS, and a CRS. In addition, the reference signal may further include a CSI-RS. Such a reference signal is a signal transmitted from a base station in a dormant state in order to reduce power consumption and an interference signal. Using such a reference signal, the UE may detect a base station in a dormant state or measure channel quality of a cell associated with the reference signal.

The UE may identify the reference signal based on the reference signal configuration information in operation S830. For example, the UE may identify the reference signal transmitted by the second base station using the received reference signal configuration information. To this end, the UE may use cell identity information of the second base station, which may be included in the reference signal configuration information. Alternatively, the UE may identify the reference signal using scrambling identity information, which may be included in the reference signal configuration information and may be used by the second base station to generate the reference signal. In addition, the UE may utilize at least one of information on a signal type of each signal configuring a reference signal included in the reference signal configuration information, information on a reference signal type, information on whether a second base station is active, and a reference signal measurement procedure type set according to each reference signal.

Hereinafter, embodiments of the present disclosure will be described in detail.

First Embodiment: Setting a Cell Measurement/Discovery Type Through Higher Layer Signaling (for Example, RRCConnectionReconfiguration Message)

FIG. 9 illustrates an example of information elements of measurement configuration information.

FIG. 10 illustrates an example of information elements of an RRC configuration reconfiguration (RRCConnectionReconfiguration) message as higher layer signaling.

Referring to FIG. 9 and FIG. 10, as an example of high layer signaling, a RRC connection reconfiguration message (RRCConnectionReconfiguration) may include measurement configuration information for an LTE/LTE-Advanced (E-UTRA) cell. Such measurement configuration information in the RRC connection reconfiguration message includes frequency information for measurement, measurement cell list configuration information, measurement gap configuration information, and measurement reporting-related configuration information. Such information is transmitted through the RRC connection reconfiguration message (RRCConnectionReconfiguration). In addition, a RRC connection reconfiguration message associated with secondary cell addition (SCell addition) may include secondary cell index information, cell identification information (PCID, DL-carrier frequency), and radio resource configuration information. Such information is transmitted through the RRC connection reconfiguration (RRCConnectionReconfiguration) message. Such information elements of the RRC connection reconfiguration messages are shown in FIG. 9 and FIG. 10.

In accordance with at least one embodiment, a plurality of cell measurement/discovery procedures is defined for measuring or discovering a cell in a dormant state, an inactive state, or an OFF state. Accordingly, information regions are also defined for a type of a downlink reference signal and a type of a corresponding cell measurement/discovery procedure in order to enable a UE to measure or discover a cell when the cell is in a dormant state or an OFF state. Such information may be included in the RRC connection reconfiguration message for measurement configuration or the RRC connection reconfiguration message for secondary cell addition (SCell addition). That is, when a measurement configuration-related RRC connection reconfiguration message is transmitted to a UE for Carrier Aggregation (CA) or handover in a small cell deployment scenario, a measurement/discovery procedure type may be set for performing measurement/discovery of the corresponding small cell and transmitted to a corresponding UE through RRC signaling. Alternatively, when a SCell addition-related RRC connection reconfiguration message is transmitted to the UE for CA of the corresponding small cell frequency band, a measurement/discovery procedure type for performing measurement/discovery of the corresponding small cell is set and transmitted to the corresponding UE through RRC signaling. The information on the corresponding measurement/discovery procedure type indicates reference signal configuration information for discovering the corresponding cell and measuring a downlink channel of the corresponding cell. The UE may perform channel measurement based on a reference signal configured for discovering the corresponding cell, based on the corresponding configuration value.

In accordance with at least one embodiment, a UE receives reference signal configuration information from a first base station (e.g., a macro cell base station) that establishes a radio link to the UE and identifies a reference signal using the received reference signal configuration information which is transmitted from the second base station.

Hereinafter, various examples of reference signal configuration information of the first embodiment will be described.

First Sub-Embodiment 1

The reference signal configuration information may include at least one of information on a signal type of each signal forming a reference signal, information on a reference signal type of a reference signal, information on whether a second base station is active, and information on a measurement/discovery procedure type of a measurement/discovery procedure.

For example, the signal type information, the reference signal type information, and the measurement/discovery procedure type information may be defined as an information region that indicates reference signal configuration information used for a UE to discover a corresponding cell when the corresponding cell is in a dormant state. That is, the signal type information, the reference signal type information, and the measurement/discovery procedure type information may be defined as an information region for indicating a type of a downlink reference signal that the UE needs to receive for discovery and measurement of the corresponding cell when the corresponding cell is a dormant state that does not transmit a PSS, a SSS, and a CRS.

Particularly, a measurement/discovery reference signal and a corresponding cell measurement/discovery procedure thereof for measuring and discovering a cell in a dormant state may be defined as one or more of a burst CRS-based cell measurement/discovery procedure, a CSI-RS-based cell measurement/discovery procedure, a PRS-based cell measurement/discovery procedure, and a new discovery reference signal-based cell measurement/discovery procedure. For example, the information on a signal type of a signal forming a reference signal may be defined as a burst CRS-based reference signal, a PRS-based reference signal, a CSI-RS-based reference signal, a newly defined reference signal as described. For example, the information on the reference signal type is classified into a CRS, a PRS, and a CSI-RS, a newly defined reference signal, as described above. Accordingly, the information on the reference signal type may be configured in association with a corresponding type.

A first base station may i) select a cell measurement/discovery procedure that a UE needs to perform among the four types of cell measurement/discovery procedures ii) set at least one of the information regions of the reference signal configuration information (e.g., the measurement/discovery procedure type information, the reference signal type information, and the signal type information) based on the selected cell measurement/discovery procedure and iii) informs the UE of the selected cell measurement/discovery procedure through the reference signal configuration information. In this instance, when the UE fails to detect transmission of a PSS, a SSS, and a CRS from a corresponding cell, the UE determines that the corresponding is in a dormant state. In this case, the UE performs a measurement/discovery procedure corresponding to a measurement/discovery reference signal which is defined according to a type value of a measurement/discovery procedure configured for an inactive cell.

In addition, the reference signal configuration information may include information on whether a corresponding cell is active (ON state or OFF state) in an RRC connection reconfiguration message for helping the cell measurement/discovery procedure of the UE.

In this instance, the UE is able to determine whether a corresponding base station is an active state (e.g., ON state) or a dormant state (e.g., off state) based on the received reference signal configuration information with the information on a corresponding base station is active. When the corresponding base station is an active state, the UE performs a PSS, SSS, and CRS-based cell measurement/discovery. When the corresponding base station is a dormant state, the UE may perform a reference signal-based cell measurement/discovery defined in accordance with at least one embodiment.

Second Sub-Embodiment 2

Unlike the first sub-embodiment 1, the reference signal configuration information may be configured irrespective of whether a corresponding cell (e.g., a base station) is in an active state or a dormant state in the second sub-embodiment 2.

For example, a measurement/discovery procedure type may be defined irrespective of a state of a cell (whether a cell is active). In particular, three types of cell measurement/discovery procedures may be defined. For example, the cell measurement/discovery procedures include a PSS, SSS, and CRS-based type-1 cell measurement/discovery procedure, a CSI-RS-based type-2 cell measurement/discovery procedure, and a PRS-based type-3 cell measurement/discovery procedure.

A first base station establishing a radio link with a UE may include the described type information in reference signal configuration information and transmit the same to the UE. The reference signal configuration information may be set with type information for a corresponding cell and may be transmitted through an RRC connection reconfiguration message. In this instance, the UE may be defined to use a measurement/discovery procedure type set based on the reference signal configuration information, irrespective of the state of the corresponding cell (whether the cell is in an active state).

As another example, a reference signal for small cell measurement/discovery may be classified into and defined as a PSS, SSS, and CRS-based reference signal and a CSI-RS based reference signal. The reference signal configuration information may include information on a cell requiring a PSS, SSS, and CRS-based measurement/discovery and information on a cell requiring a CSI-RS-based measurement. That is, a UE needs to know a reference signal type to be used for measurement or discovery with respect to a cell. Thus, a first base station may include a list of cells associated with each reference signal in an RRC connection reconfiguration message and transmit the same. In particular, the first base station includes, in the reference signal configuration information, a list of cells requiring CRS-based measurement (e.g., physical cell identifier list (PCID list)) and a list of cells requiring CSI-RS-based measurement (e.g., a PCID or a VCID for scrambling a CSI-RS) and transmits the same to the UE through higher layer signaling. Here, the higher layer signaling may be a RRC connection reconfiguration message, as described. In other words, the reference signal configuration information may include information on a physical cell identity (PCID) of a second base station that transmits a reference signal or information on a scrambling identification used by the second base station to generate the reference signal.

The number of cell measurement/discovery procedure types and the method of defining a reference signal for each type of the cell measurement/discovery procedures, provided in the above descriptions, are merely an example. The embodiments of the present disclosure are not limited thereto.

Second Embodiment: Small Cell ON/OFF State Information

When it is defined to use a cell measurement/discovery procedure defined based on a measurement/discovery procedure type, which is defined irrespective of a cell state, as described in the second sub-embodiment 2 of the first embodiment, a UE may be defined to obtain information on a cell state of a corresponding cell according to a measurement/discovery procedure type. That is, a corresponding cell measurement/discovery procedure type may be defined to be set only in a cell in an active (ON) state, and the remaining measurement/discovery procedure types may be defined to be set in a cell in a dormant (OFF) state.

Alternatively, information indicating a cell state of a cell may be included in an RRC connection reconfiguration message for measurement configuration or an RRC connection reconfiguration message for SCell addition. For example, the cell state information may be a 1-bit information region. When the information region indicating the cell state is defined, it may be additionally defined to differently set the measurement/discovery procedure types of the first sub-embodiment 1 based on a corresponding cell state. That is, cell measurement/discovery procedures based on a measurement/discovery procedure type associated with an active state may be defined independently from cell measurement discovery procedures based on a measurement/discovery procedure type associated with a dormant state.

In addition, when a secondary cell (SCell) added through the RRC connection reconfiguration message becomes active, the secondary cell may be interpreted as being always changed to an active state irrespective of a currently state of the secondary cell (SCell). Accordingly, a RSS, SSS, and CRS based measurement/discovery procedure may be defined implicitly for the secondary cell (SCell).

The embodiments of the present disclosure were described based on the certain small cell deployment scenarios. However, the embodiments are not limited thereto. The embodiments may be commonly applied to any other cell deployment scenarios irrespective of a cell size or a cell type. In addition, the term "cell" is used to indicate a service coverage area set by a transmission/reception point installed by a service provider. In general, the cell may be referred to as a transmission/reception point, an eNB, a RRH, a RU, and a transmission point (TP). In addition, the cell itself may indicate a transmission/reception point.

Figure 11:
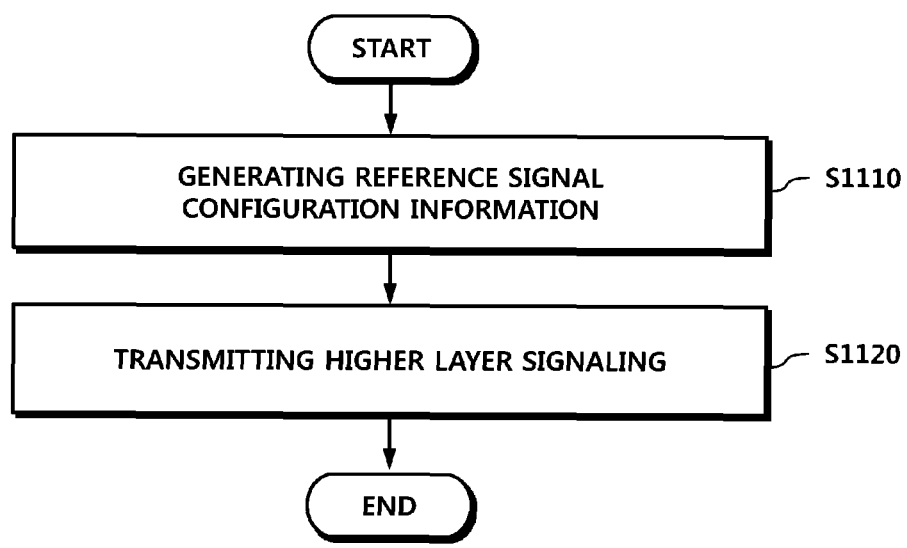
FIG. 11 is a flowchart illustrating operations of a base station according to an embodiment of the present disclosure.

FIG. 11 is a flowchart illustrating operations of a base station according to an embodiment of the present disclosure.

According to an embodiment, a method may be provided for enabling a first base station to transmit reference signal configuration information for small cell discovery. The method may include i) generating reference signal configuration information associated with a reference signal transmitted by a second base station, and ii) transmitting the reference signal configuration information to the UE through higher layer signaling.

Referring to FIG. 11, the first base station generates reference signal configuration information associated with a reference signal transmitted by the second base station in operation S1110. The reference signal configuration information may include information required for implementing the first embodiment or the second embodiment. For example, the reference signal configuration information may include at least one of: i) signal type information (e.g., information on a type of each signal forming a reference signal), ii) reference signal type information (e.g., information on a type of a reference signal), iii) cell state information (e.g., information on whether a second base station is active), and iv) measurement/discovery procedure type information (e.g., information on type of a measurement/discovery procedure). As another example, the reference signal configuration information may cell list information (e.g., information on cells distinguished by a reference signal type, such as a CRS-based reference signal and a CSI-RS-based reference signal. As another example, the reference signal configuration information may further include physical cell identity information (e.g., information on a physical cell identity of the second base station that transmits the reference signal). As another example, the reference signal configuration information may include scrambling identity information (e.g., information on scrambling identity used by the second base station for generating a reference signal). The first base station may generate the reference signal configuration information by including at least one of the above described information.

The first base station may transmit the reference signal configuration information to a UE through higher layer signaling in operation S1120. For example, the first base station transmits, to the UE, the generated reference signal configuration information through higher layer signaling. The higher layer signaling may be an RRC connection reconfiguration message for measurement configuration or an RRC connection reconfiguration message for secondary cell (SCell) addition. The UE receives the reference signal configuration information from the first base station and determines a reference signal transmitted from the second base station based on the reference signal configuration information. That is, the UE may perform cell discovery or cell measurement based on the reference signal and the reference signal configuration information.

In addition, the first base station may perform operations required for implementing the above described operations of the embodiments of the present disclosure. For example, the reference signal transmitted from the second base station may be a reference signal transmitted from the second base station in a dormant state.

As described above, the embodiments of the present disclosure provide a detailed procedure for receiving a reference signal of a small cell base station that performs an ON/OFF switching operation in a small cell deployment environment including a macro cell and small cells overlapping the macro cell. In addition, the embodiments of the present disclosure provide a detailed method for enabling a UE to receive reference signal configuration information for identifying a reference signal transmitted from a base station. Furthermore, the embodiments of the present disclosure provide a detailed method and apparatus for enabling a UE to measure a channel quality using a reference signal for small cell discovery, so as to minimize signal interference.

Figure 12:
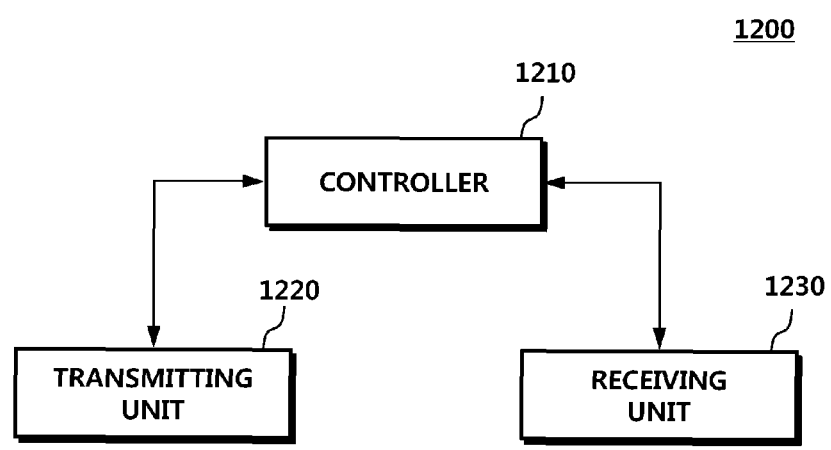
FIG. 12 is a diagram illustrating a configuration of a UE according to an embodiment of the present disclosure.
Figure 13:
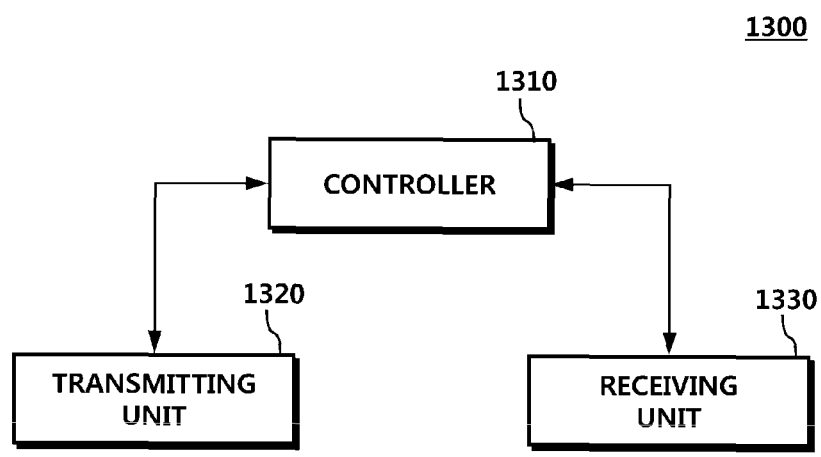
FIG. 13 is a diagram illustrating a configuration of a base station according to an embodiment of the present disclosure.

FIG. 12 and FIG. 13 illustrate configurations of a UE and a base station for performing the above described operations of the embodiments of the present disclosure.

FIG. 12 is a diagram illustrating a configuration of a UE according to an embodiment.

Referring to FIG. 12, a UE 1200 is configured to measure a reference signal for small cell discovery according to an embodiment. The UE 120 includes a receiving unit 1230, a controller 1210, and a transmitting unit 1220. The receiving unit 1230 receives, from a first base station, higher layer signaling including reference signal configuration information for measuring a channel quality using a reference signal. The receiving unit 1230 receives a reference signal transmitted from a second base station. The controller 1210 identifies the reference signal based on the reference signal configuration information.

The receiving unit 1230 may receive the reference signal configuration information from the first base station. The receiving unit 1230 may receive the reference signal from the second base station. The reference signal configuration information may include information required for implementing operations of the above described first embodiment or second embodiment. For example, the reference signal configuration information may include at least one of signal type information (e.g., information on a type of each signal forming a reference signal), reference signal type information (e.g., information on a reference signal type), cell state information (e.g., information on whether a second base station is active), and measurement procedure type information (e.g., information on a type of a measurement procedure). As another example, the reference signal configuration information may include cell list information (e.g., information on cells distinguished by a CRS-based reference signal and a CSI-RS-based reference signal). As another example, the reference signal configuration information may include physical cell identity information (e.g., information on a physical cell identity of the second base station that transmits the reference signal). As another example, the reference signal configuration information may include scrambling identity information (e.g., information on a scrambling identity used by the second base station for generating a reference signal). The receiving unit 1230 may receive the reference signal configuration information through higher layer signaling, and the higher layer signaling may be an RRC connection reconfiguration. In addition, the receiving unit 1230 may receive, from a base station, downlink control information, downlink data, a message, through a corresponding channel.

The controller 1210 may identify the reference signal using the reference signal and the reference signal configuration information. In addition, the controller 1210 may discover a small cell in a dormant state or measure a channel quality of the small cell, using the received reference signal based on the reference signal configuration information. In addition, the controller 1210 may control general operations of the UE in association with operations of setting a small cell measurement and discovery procedure based on a reference signal for small cell discovery and identifying the reference signal based on the corresponding procedure, which is required for implementing operations of the embodiments of the present disclosure.

The transmitting unit 1220 transmits, to a base station, uplink control information, data, a message, through a corresponding channel.

FIG. 13 is a diagram illustrating a configuration of a base station according to an embodiment of the present disclosure.

Referring to FIG. 13, a base station 1300 may be configured to transmit reference signal configuration information for small cell discovery according to an embodiment. The base station 1300 includes a controller 1310, a transmitting unit 1320, and a receiving unit 1330.

The controller 1310 generates reference signal configuration information associated with a reference signal transmitted from a second base station. The transmitting unit 1320 transmits, to a UE, the reference signal configuration information through higher layer signaling.

The controller 1310 controls operations of the base station in association with a small cell measurement/discovery procedure performed by a UE based on a reference signal. The controller 1310 controls operations of the base station in association with generating and transmitting the reference signal configuration information, which are required for implementing the embodiments of the present disclosure. In addition, the controller 1310 may generate the reference signal configuration information. The reference signal configuration information may include information required for implementing the operations of the first embodiment or the second embodiment. For example, the reference signal configuration information may include at least one of signal type information (e.g., information on a type of each signal forming a reference signal), reference signal type information (e.g., information on a reference signal type), cell state information (e.g., information on whether a second base station is active), and measurement procedure type information (e.g., information on a measurement procedure type designated by a corresponding reference signal). As another example, the reference signal configuration information may cell list information (e.g., information on cells distinguished by a CRS-based reference signal and a CSI-RS-based reference signal. As another example, the reference signal configuration information may include physical cell identity information (e.g., information on a physical cell identity of the second base station that transmits the reference signal). As another example, the reference signal configuration information may include scrambling identity information (e.g., information on a scrambling identity used by the second base station for generating a reference signal).

The transmitting unit 1320 may transmit the reference signal configuration information to a UE through higher layer signaling. The higher layer signaling may be the RRC connection reconfiguration message.

In addition, the transmitting unit 1320 and the receiving unit 1330 may be used for transmitting, to a UE, and receiving, from the UE, signals, messages, and data required for implementing the above described embodiments of the present disclosure.

Although the embodiments of the present disclosure have been described for illustrative purposes, those skilled in the art will appreciate that various modifications, additions and substitutions are possible, without departing from the scope and spirit of the embodiments. Therefore, the embodiments disclosed in the present invention are intended to illustrate the scope of the technical idea of the present disclosure, and the scope of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A method for enabling a User Equipment (UE) to measure a reference signal for small cell discovery, the method comprising:
   receiving, by the UE from a first base station, a higher layer signaling message including reference signal configuration information for at least one of a channel quality measurement and a small cell discovery;
   receiving, by the UE, a reference signal transmitted from a second base station of a small cell being in a dormant state; and
   identifying, by the UE, the reference signal received from the second base station, based on the reference signal configuration information received the first base station,
   wherein the reference signal configuration information includes (i) Physical Cell Identity (PCID) information of the second base station that transmits the reference signal and (ii) information on a scrambling identity used by the second base station to generate the reference signal.

2. The method of claim 1, wherein the reference signal includes a Channel State Indicator Reference Signal (CSI-RS).

3. The method of claim 1, wherein the higher layer signaling message includes an RRC connection reconfiguration message (RRC ConnectionReconfiguration).

4. The method of claim 1, wherein the reference signal configuration information further includes at least one of signal type information on a type of each signal forming the reference signal, reference signal type information on a type of the reference signal, cell state information on whether the second base station is active, and measurement procedure type information on a type of a measurement procedure.

5. The method of claim 1, the first base station is a macro cell base station establishing a radio link with the UE.

6. A method for enabling a first base station to transmit reference signal configuration information for small cell discovery, the method comprising:
   generating, by the first base station, reference signal configuration information associated with a reference signal transmitted from a second base station, wherein the reference signal is transmitted to a User Equipment (UE) by the second base station of a small cell being in a dormant state; and
   transmitting, by the first base station to the UE, the reference signal configuration information through a higher layer signaling message such that the UE identifies the reference signal based on the reference signal configuration information, wherein the reference signal configuration information includes (i) Physical Cell Identity (PCID) information of the second base station that transmits the reference signal and (ii) information on a scrambling identity used by the second base station to generate the reference signal.

7. The method of claim 6, wherein the reference signal includes a Channel State Indicator Reference Signal (CSI-RS).

8. The method of claim 6, wherein the higher layer signaling message includes an RRC connection reconfiguration message (RRC ConnectionReconfiguration).

9. The method of claim 6, wherein the reference signal configuration information further includes at least one of signal type information on a type of each signal forming the reference signal, reference signal type information on a type of the reference signal, cell state information on whether the second base station is active, and measurement procedure type information on a type of a measurement procedure designated based on the reference signal.

10. The method of claim 6, the first base station is a macro cell base station establishing a radio link with the UE.

11. A User Equipment (UE) for measuring a reference signal for small cell discovery, the UE comprising:

a receiving unit configured to receive, from a first base station, a higher layer signaling message including reference signal configuration information for at least one of a channel quality measurement and a small cell discovery and configured to receive a reference signal transmitted from a second base station of a small cell being in a dormant state; and a controller configured to identify the reference signal received from the second base station, based on the reference signal configuration information received the first base station, wherein the reference signal configuration information includes (i) Physical Cell Identity (PCID) information of the second base station that transmits the reference signal and (ii) information on a scrambling identity used by the second base station to generate the reference signal.

12. The UE of claim 11, wherein the reference signal includes a Channel State Indicator Reference Signal (CSI-RS).

13. The UE of claim 11, wherein the higher layer signaling includes an RRC connection configuration message (RRC ConnectionReconfiguration).

14. The UE of claim 11, wherein the reference signal configuration information further includes at least one of signal type information on a type of each signal forming the reference signal, reference signal type information on a type of the reference signal, cell state information on whether the second base station is active, and measurement procedure type information.

\* \* \* \* \*